June 19, 1928.
J. W. BAGLEY
1,674,540
TILT REGISTERING MEANS FOR CAMERAS
Filed Oct. 9, 1923
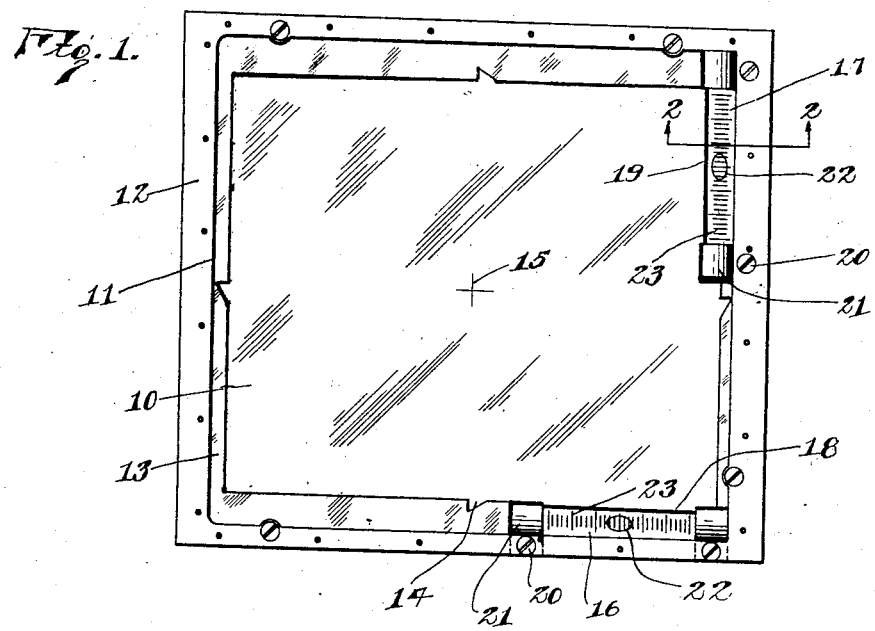
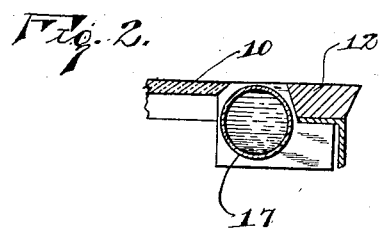
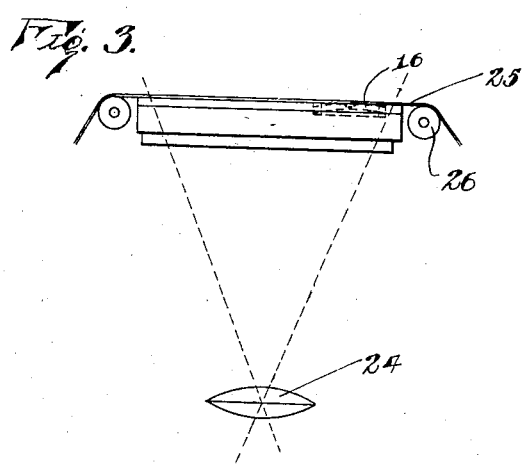
INVENTOR
James W. Bagley
BY
Robert H. Young
ATTORNEY Patented June 19, 1928.

1,674,540

UNITED STATES PATENT OFFICE.

JAMES W. BAGLEY, OF DAYTON, OHIO.

TILT-REGISTERING MEANS FOR CAMERAS.

Application filed October 9, 1923. Serial No. 667,553.

This invention relates to tilt registering means for cameras and while it is primarily designed and intended for use in registering the tilt from the horizontal of aircraft cameras in photographing the land, it is adaptable to photographic work in general wherever it is necessary or desirable to record the tilt of the camera at the instant of exposure.

The principal object of the invention is to provide a tilt registering means capable of producing a shadowgraph on the film or plate, or other sensitive element which consists of a bubble level disposed approximately in the focal plane of the camera adjacent the marginal edge and in front of the film.

Another object of the invention is to provide in connection with a sectored focal plane in a camera a number of bubble levels disposed approximately in the focal plane at the marginal edges on two sides and approximately at right angles to each other to indicate the components of tilt of the camera in coordinal directions at the instant of exposure.

Still another object of the invention is to provide tilt registering means for cameras comprising transparent vials containing a nearly colorless liquid and graduated in order to produce shadowgraphs on the film which will indicate by the position of the images of the bubbles in the vials with reference to the images of the graduations thereon appearing on the film the degree to which the camera was tilted at the instant of exposure.

The invention is illustrated in the accompanying drawing in which Fig. 1 is an underside plan view looking at the focal plane of a camera equipped with tilt registering means in accordance with my invention. Fig. 2 is a sectional detail on an enlarged scale taken on the line 2—2 of Fig. 1, looking in the direction of the arrows. Fig. 3 is a diagrammatic view showing the relative arrangement of the tilt registering levels, the camera lens, and the sensitized film on which the record of the tilt is to be made. Throughout the views the same reference numerals refer to the same parts.

Aircraft cameras used in photographing the land are equipped with a glass plate 10 disposed approximately in the focal plane of the camera, in the light opening 11 of the frame 12 of the camera. The plate 10 has its marginal edges ground as indicated at 13 leaving in relief reference marks 14 at the middle of the four sides. These marks, together with a bench mark 15 at the center of the plate 10 divide the view on the exposed film, plate, or other sensitive element into sectors for convenience in piecing together a series of photographs taken of the land from an aircraft. It is material, in taking such photographs, to make certain that the camera was horizontal or nearly so within given limits in order that the view taken may be considered an accurate representation, and for this purpose I have provided means for producing a graphic record on the marginal edges of the film upon exposure indicating the extent and direction of tilt of the camera at the instant of exposure. This means comprises a pair of spirit bubble levels or vials 16 and 17 disposed approximately in the focal plane in cutaway portions 18 and 19 in the edges of the glass plate 10. These vials are fastened to the frame 12 by screws 20 entered through the frame 12 into blocks 21, in which the ends of the vials are received. The vials 16 and 17 are made of a clear glass to permit the free passage of light therethru and are also slightly curved as indicated in Fig. 3, so that the movement of the bubbles 22 therein with reference to graduations 23 thereon will indicate the degree to which the camera is tilted at any given time. I have found that by the use of a nearly colorless transparent liquid in the vials, as for example, kerosene, a bubble in the liquid and the graduations on the vials as well produce clear shadowgraphs on the film upon exposure. By mounting the vials approximately in right angular relation at the marginal edges of the focal plane, the shadowgraphs produced upon the film show graphically the direction and extent of tilt of the camera in coordinal directions at the instant of exposure. The liquid used in the vials is particularly desirable not only because it is capable of producing shadowgraphs on films but also because of its relatively low coefficient of expansion and the fact that it is relatively light weight.

The aircraft cameras in connection with which the invention is particularly designed to be used are operated sighting downwardly so that light passing through the lens represented at 24 is focused at the focal plane upon the film represented at 25. The film is fed over rollers 26 with reference to the plate 10, in the marginal edges of which the vials above described are set. It is apparent that any inclination of the camera from the horizontal at the instant the exposure is made will produce shadowgraphs on the film indicating the direction and extent of such inclination in coordinal directions by reference to the position of the bubble images on the film in relation to the images of the index marks. The inclination of the camera toward any one of the four sectors into which the view on the film is divided is of course indicated by the positions of the bubble images.

I claim:

1. In a camera including a glass plate disposed in the focal plane and having certain edges thereof cut away, and tilt-registering means for said camera positioned in the cut away openings in said glass plate.

2. In a camera including a frame and a glass plate carried by said frame and disposed in the focal plane of the camera, said plate cut away at certain edges thereof, and tilt registering means on said frame and positioned in the cut away openings in said glass.

In testimony whereof I affix my signature.

JAMES W. BAGLEY.